(12) United States Patent
Hansen et al.

(10) Patent No.: US 10,370,285 B2
(45) Date of Patent: Aug. 6, 2019

(54) MAN-MADE VITREOUS FIBRES

(71) Applicant: Rockwool International A/S, Hedehusene (DK)

(72) Inventors: Lars Erik Hansen, Søborg (DK); Mette Solvang, Roskilde (DK); Susanne Dehn, Roskilde (DK)

(73) Assignee: ROCKWOOL INTERNATIONAL A/S, Hedehusene (DK)

( * ) Notice: Subject to any disclaimer, the term of this patent is extended or adjusted under 35 U.S.C. 154(b) by 0 days.

(21) Appl. No.: 15/022,972

(22) PCT Filed: Oct. 16, 2014

(86) PCT No.: PCT/EP2014/072200
§ 371 (c)(1),
(2) Date: Mar. 18, 2016

(87) PCT Pub. No.: WO2015/055758
PCT Pub. Date: Apr. 23, 2015

(65) Prior Publication Data
US 2016/0221862 A1    Aug. 4, 2016

(30) Foreign Application Priority Data
Oct. 16, 2013 (EP) .................................. 13188945

(51) Int. Cl.
*C03B 37/05* (2006.01)
*C03C 13/00* (2006.01)
(Continued)

(52) U.S. Cl.
CPC ............ *C03B 37/055* (2013.01); *C03C 3/062* (2013.01); *C03C 3/085* (2013.01); *C03C 13/00* (2013.01);
(Continued)

(58) Field of Classification Search
CPC ........ C03B 37/055; C03C 3/062; C03C 3/085
See application file for complete search history.

(56) References Cited

U.S. PATENT DOCUMENTS 4,238,213 A    12/1980  Pallo et al.
5,468,274 A *  11/1995  Grove-Rasmussen ......................
                                                    C03B 37/055
                                                    65/455
(Continued)

FOREIGN PATENT DOCUMENTS

EP    0148050 A2    7/1985
EP     465310 A1    1/1992
(Continued)

OTHER PUBLICATIONS

International Search Report to corresponding International Patent Application No. PCT/EP2014/072200, dated Feb. 16, 2015, 3 pages.
(Continued)

*Primary Examiner* — Jodi C Franklin
(74) *Attorney, Agent, or Firm* — Tarolli, Sundheim, Covell & Tummino LLP (57) ABSTRACT

The invention provides a method of manufacture of man-made vitreous fibers (MMVF) comprising: providing a fiberizing apparatus, wherein the fiberizing apparatus comprises: a set of at least three rotors each mounted for rotation about a different substantially horizontal axis; wherein each rotor has a driving means; rotating the rotors; wherein the first rotor rotates to give an acceleration field of from 25 to 60 km/s$^2$ and the second and third rotors each rotate to give an acceleration field of at least 125 km/s$^2$, providing a mineral melt, wherein the melt has a composition comprising the following, expressed by wt of oxides: $SiO_2$ in an amount of from 33 to 45 wt %, $Al_2O_3$ in an amount of from 16 to 24 wt %, an amount of $K_2O$ and/or $Na_2O$, an amount of CaO and/or MgO, wherein the ratio of the amount of $Al_2O_3$ to the amount of $SiO_2$ is in the range 0.34-0.73, (Continued)

wherein the ratio of the total amount of $K_2O$ and $Na_2O$, to the total amount of CaO and MgO, is less than 1; pouring the melt on to the periphery of the first rotor; wherein melt poured on to the periphery of the first rotor in the set is thrown on to the periphery of the subsequent rotors in turn and fibers are thrown off the rotors; and collecting the fibers that are formed. Man-made vitreous fibers (MMVF) can thus be formed having a median length of 100 to 300 μm, a median diameter of not more than 2.5 μm, and wherein the ratio of the median fiber length to median fiber diameter is 25 to 500.

10 Claims, 4 Drawing Sheets (51) Int. Cl.
    *C03C 3/062* (2006.01)
    *C03C 3/085* (2006.01)
    *C03C 13/06* (2006.01)
    *C09K 21/02* (2006.01)
    *D21H 13/40* (2006.01)

(52) U.S. Cl.
    CPC .............. *C03C 13/06* (2013.01); *C09K 21/02* (2013.01); *D21H 13/40* (2013.01); *Y02P 40/57* (2015.11)

(56) References Cited

U.S. PATENT DOCUMENTS 5,906,669 A * 5/1999 Tonder .................. C03B 37/055
                                                                 65/455

5,954,852 A * 9/1999 Jensen .................. C03B 37/055
                                                                  65/377

FOREIGN PATENT DOCUMENTS

| EP | 0996653 A1 | 5/2000 |
|---|---|---|
| EP | 1515921 A2 | 3/2005 |
| GB | 1559117 | 1/1980 |
| WO | 9212939 A1 | 8/1992 |
| WO | 9212940 A1 | 8/1992 |
| WO | 99/56526 A1 | 11/1999 |
| WO | 0073230 A1 | 12/2000 |
| WO | 0160754 A1 | 8/2001 |
| WO | 2007014236 A2 | 2/2007 |
| WO | 2009080938 A3 | 7/2009 |
| WO | 2011/006875 A2 | 1/2011 |
| WO | 2011138458 A1 | 11/2011 |
| WO | 2012010694 A1 | 1/2012 |
| WO | 2012076462 A1 | 6/2012 |
| WO | 2013014076 A1 | 1/2013 |

OTHER PUBLICATIONS

Bottinga et al., "The Viscosity of Magmatic Silicate Liquids: A Model for Calculation" American Journal of Science, vol. 272, 1972, pp. 438-475.

"Nomenclature of man-made vitreous fibres" by the Nomenclature Committee of TIMA Inc., printed Apr. 15, 1991, TIMA Inc.

Notice of Opposition for corresponding Application Serial No. EP 14790542.6, dated Oct. 8, 2018, pp. 1-15.

* cited by examiner

MAN-MADE VITREOUS FIBRES

RELATED APPLICATIONS

The present application is a U.S. National Stage under 35 USC 371 patent application, claiming priority to Serial No. PCT/EP2014/072200, filed on Oct. 16, 2014, which claims priority from EP 13188945.3, filed on Oct. 16, 2013, both of which are incorporated herein by reference.

TECHNICAL FIELD

The present invention relates to man-made vitreous fibres (MMVF), a man-made vitreous fibre substrate, use of a man-made vitreous fibre substrate, a method of manufacture of man-made vitreous fibres and an apparatus for formation of man-made vitreous fibres.

BACKGROUND

It is known to use MMVF as an insulation material to provide acoustic or heat insulation. The MMVF are usually formed into an MMVF substrate which is formed as a bonded web comprising the MMVF and a cured binder composition. The requirements for an MMVF substrate to withstand heat vary depending on the ultimate use of the MMVF substrate. For example, in marine and industrial applications, the MMVF substrate used as technical insulation is required to withstand high temperatures such as greater than 950° C. for prolonged periods of time, such as at least 30 minutes, when used for fire protection, or temperatures in the range of 100-650° C. in continuous use, when used for high temperature technical installations. Building regulations or other regulations in different countries determine the specification required for technical insulation. The lower the thermal conductivity, expressed in terms of the lambda value, of an MMVF substrate at a given temperature, the more resistant the MMVF substrate is to transmitting heat.

The air flow resistivity of an MMVF substrate should be as high as possible to reduce the amount of air that can pass through the MMVF substrate. A high air flow resistivity for a product indicates an improved ability of the MMVF substrate to withstand heat.

One way to increase the resistance of an MMVF substrate to temperature is to increase the volume of MMVF substrate. This has the effect of increasing the time required for heat to transfer across an MMVF substrate. Increasing the volume of the MMVF substrate however is undesirable as it increases the cost of the technical insulation, increases the space required for the technical insulation and increases the environmental impact of producing the technical insulation.

It is desirable that an MMVF substrate is easy to handle and causes little irritation to the skin.

There is a need to produce an MMVF substrate with a lower thermal conductivity at a given temperature, for example at 300° C. or higher. Further, there is a need for an MMVF substrate with increased air flow resistivity. Further, there is a need for an MMVF substrate with improved skin-friendliness. Further there is a need to produce an MMVF substrate which is environmentally friendly. The present invention solves these problems.

BRIEF DESCRIPTION OF THE INVENTION

In a first aspect of the invention, there is provided a method of manufacture of man-made vitreous fibres (MMVF) comprising:

providing a fiberising apparatus, wherein the fiberising apparatus comprises:
  a set of at least three rotors each mounted for rotation about a different substantially horizontal axis;
wherein each rotor has a driving means;
rotating the rotors;
  wherein the first rotor rotates to give an acceleration field of from 25 to 60 km/s$^2$ and the second and third rotors each rotate to give an acceleration field of at least 125 km/s$^2$,
providing a mineral melt, wherein the melt has a composition comprising the following, expressed by wt of oxides:
  $SiO_2$ in an amount of from 33 to 45 wt %,
  $Al_2O_3$ in an amount of from 16 to 24 wt %,
  an amount of $K_2O$ and/or $Na_2O$,
  an amount of CaO and/or MgO,
  wherein the ratio of the amount of $Al_2O_3$ to the amount of $SiO_2$ is in the range 0.34-0.73,
wherein the ratio of the total amount of $K_2O$ and $Na_2O$, to the total amount of CaO and MgO, is less than 1;
pouring the melt on to the periphery of the first rotor;
  wherein melt poured on to the periphery of the first rotor in the set is thrown on to the periphery of the subsequent rotors in turn and fibres are thrown off the rotors; and
collecting the fibres that are formed.

In a second aspect of the invention, there is provided an apparatus for formation of man-made vitreous fibres (MMVF) comprising a set of at least three rotors each mounted for rotation about a different substantially horizontal axis and arranged such that when the rotors are rotating melt poured on to the periphery of the first rotor in the set is thrown on to the periphery of the subsequent rotors in turn and fibres are thrown off the rotors, characterised in that the first rotor is provided with driving means and has a size such that it can rotate to give an acceleration field of from 25 to 60 km/s$^2$ and the second and third rotors are each provided with driving means and each have a size and can rotate such as to give an acceleration field of at least 125 km/s$^2$.

In a third aspect of the invention, there are provided man-made vitreous fibres (MMVF) formed from a mineral melt, wherein the MMVF have a median length of 100 to 300 µm, a median diameter of not more than 2.5 µm, and wherein the ratio of the median fibre length to median fibre diameter is 25 to 500.

In a fourth aspect of the invention, there is provided a man-made vitreous fibre substrate (MMVF substrate) formed as a bonded web comprising the MMVF according to the third aspect of the invention, or the MMVF made by a method according to the first aspect of the invention, and a cured binder composition.

In a fifth aspect of the invention, there is provided the use of an MMVF substrate according to the fourth aspect of the invention (a) as technical insulation or (b) for fire protection in an industrial or marine environment.

In a sixth aspect of the invention, there is provided the use of an MMVF substrate according to the fourth aspect of the invention as a marine batt, a marine slab, a marine lamella mat, a marine wired mat, a marine pipe section or a marine firebatt.

In a seventh aspect of the invention, there is provided the use of an MMVF substrate according to the fourth aspect of the invention (a) as technical insulation or (b) fire protection at a temperature of at least 300° C.

In an eighth aspect of the invention, there is provided a method of manufacture of man-made vitreous fibres (MMVF) comprising:

providing a fiberising apparatus, wherein the fiberising apparatus comprises:
a set of at least three rotors each mounted for rotation about a different substantially horizontal axis;
wherein each rotor has a driving means;
rotating the rotors;
wherein the first rotor rotates to give an acceleration field of at least 25 km/s$^2$ and the second and third rotors each rotate such as to give a greater acceleration field than the first rotor,
providing a mineral melt; wherein the melt has a composition comprising the following, expressed by wt of oxides:
$SiO_2$ in an amount of from 33 to 45 wt %,
$Al_2O_3$ in an amount of from 16 to 24 wt %,
an amount of $K_2O$ and/or $Na_2O$,
an amount of CaO and/or MgO,
wherein the ratio of the amount of $Al_2O_3$ to the amount of $SiO_2$ is in the range 0.34-0.73,
wherein the ratio of the total amount of $K_2O$ and $Na_2O$, to the total amount of CaO and MgO, is less than 1,
pouring the melt on to the periphery of the first rotor;
wherein melt poured on to the periphery of the first rotor in the set is thrown on to the periphery of the subsequent rotors in turn and fibres are thrown off the rotors; and
collecting the fibres that are formed.

DETAILED DESCRIPTION OF THE INVENTION

Method of Manufacture

The fiberising apparatus used in the method of the invention is of the type generally known as a cascade spinner. It is known to use a fiberising apparatus of this type in a method of manufacture of MMVF. A variety of configurations are known for cascade spinners, involving choice of parameters such as the diameters of the various rotors, the positioning of these rotors relative to one another and the speed at which each rotor is set to rotate. The most conventional configuration is given in GB 1,559,117. Another example of a fiberizing apparatus, which has not to date been used commercially, is in WO92/12939. The composition of the melt used with this apparatus is not disclosed. However at the publication date of the document, it was common practice to use a relatively viscous melt with a viscosity of 35 to 45 poises at 1400° C. For example, WO92/12940 discloses a melt composition and we have calculated that the melt has a viscosity of 37 poise at 1400° C. The viscosity was calculated using a model according to Bottinga and Weill, American Journal of Science, Volume 272, May 1972, page 438 to 475. A person skilled in the art would not be motivated to use a lower viscosity melt in the fiberising apparatus of this document as they would expect a proportion of the melt to splash off the rotors and thus increase the amount of shot present and increase the diameter of the MMVF produced. Hence the skilled person would expect that use of a low viscosity melt would result in high losses and very low spinning efficiency. It would be expected that the resulting MMVF would be of low quality due to a large variation in the distribution of the diameter of the MMVF and the high level of shot produced.

Surprisingly, the present inventors have established that using a lower viscosity melt is very beneficial in a fiberising apparatus in accordance with WO92/12939 and actually produces a more uniform MMVF with low levels of shot. This would not be expected based on the general understanding in the art of how such a fiberising apparatus works.

The present invention relates to a method of manufacture of man-made vitreous fibres (MMVF) comprising:

providing a fiberising apparatus, wherein the fiberising apparatus comprises:
a set of at least three rotors each mounted for rotation about a different substantially horizontal axis;
wherein each rotor has a driving means;
rotating the rotors;
wherein the first rotor rotates to give an acceleration field of from 25 to 60 km/s$^2$ and the second and third rotors each rotate to give an acceleration field of at least 125 km/s$^2$,
providing a mineral melt;
pouring the melt on to the periphery of the first rotor;
wherein melt poured on to the periphery of the first rotor in the set is thrown on to the periphery of the subsequent rotors in turn and fibres are thrown off the rotors; and
collecting the fibres that are formed.

In the method of the invention, the melt has a composition comprising the following, expressed by weight of oxides:
$SiO_2$ in an amount of from 33 to 45 wt %,
$Al_2O_3$ in an amount of from 16 to 24 wt %,
an amount of $K_2O$ and/or $Na_2O$,
an amount of CaO and/or MgO,
wherein the ratio of the amount of $Al_2O_3$ to the amount of $SiO_2$ is in the range 0.34-0.73,
wherein the ratio of the total amount of $K_2O$ and $Na_2O$, to the total amount of CaO and MgO, is less than 1.

Preferably, the melt has a composition comprising the following, expressed by weight of oxides:
$SiO_2$ in an amount of from 33 to 45 wt %,
$Al_2O_3$ in an amount of from 16 to 24 wt %,
$TiO_2$ in an amount of from 0 to 3 wt %,
$Fe_2O_3$ in an amount of from 6 to 11 wt %,
CaO and MgO in a total amount of from 23 to 33 wt %, and
$K_2O$ and $Na_2O$ in a total amount of 1 to 6 wt %.

Preferably the melt has a viscosity in the range 10 to 30 poises at 1400° C., more preferably in the range 20 to 25 poises. An advantage of choosing these viscosities is that the resulting MMVF have a smaller diameter than if the viscosity of the melt were higher. Further, it is possible to use the melt at a lower temperature in order to achieve the required operating viscosities. This saves energy, as it is possible to use the melt at a lower temperature. It also reduces the wear on the rotors, as a lower temperature melt causes less wear. The viscosity of the melt can be determined in accordance with ASTM C 965-96. Alternatively it can be determined using a model according to Bottinga and Weill, American Journal of Science, Volume 272, May 1972, page 438 to 475. Viscosity, at various temperatures, of one example of a mineral melt that can be used in the invention is indicated in the table below.

| T [° C.] | Viscosity [P] |
| --- | --- |
| 1200 | 243 |
| 1250 | 115 |
| 1300 | 56.5 |
| 1350 | 31 |
| 1400 | 18.2 |
| 1450 | 11.3 |

-continued

| T [° C.] | Viscosity [P] |
|---|---|
| 1500 | 7.4 |
| 1550 | 5 |
| 1600 | 3.5 |

It is surprising to find that when we use this melt composition, especially a melt that has a viscosity in the range 10 to 30 poises at 1400° C., the resulting MMVF have advantages described in more detail below.

The melt may be poured on to the periphery of the first rotor at a temperature of 1300 to 1700° C., preferably 1450 to 1575° C., most preferably 1480 to 1550° C.

The temperature of the melt may decrease on the subsequent rotors. For example, when there are four rotors, preferably the temperature of the surface of the periphery of the first rotor is at least 100° C. higher than the temperature of the surface of the periphery of the fourth rotor, such as 50 to 200° C. higher, preferably 100 to 150° C. higher.

An advantage of having at least three rotors rather than two rotors is that much higher grade wool is formed which in addition has a much reduced amount of coarse shot. It is preferable to have four rotors.

Preferably, each rotor in the set is provided with driving means. Preferably each of the subsequent rotors has a size such that it can give greater acceleration field than the preceding rotor in the set.

The first rotor rotates to give an acceleration field of from 25 to 60 km/s². Preferably the rotational speed is approximately 1,000 to 5,000 rpm.

Preferably, the last rotor in the set rotates to give an acceleration field that is from 5 to 15 times the acceleration field of the first rotor.

Preferably, the second and third rotors and optional fourth rotor rotate to give an acceleration field of from 125 to 500 km/s², more preferably from 125 to 400 km/s². Preferably the rotational speed is approximately 9,000 to 16,000 rpm.

Preferably, the second rotor rotates to give an acceleration field of 125 to 250 km/s². Preferably the rotational speed is approximately 9,000 to 13,000 rpm.

Preferably, the third rotor rotates to give an acceleration field of 150 to 300 km/s². Preferably the rotational speed is approximately 10,000 to 14,000 rpm.

Preferably, the optional fourth rotor rotates to give an acceleration field of 225 to 400 km/s². Preferably the rotational speed is approximately 12,000 to 16,000 rpm.

Without wishing to be limited by theory, it is thought that the gradual increase in acceleration field and rotational speed from rotor to rotor gives a smoother melt flow through the fiberising apparatus.

If the resulting MMVF substrate is a high density product, such as one having a density in the range 120 to 250 kg/m³, then the acceleration field of the rotors should be at the lower end of the ranges as this will give fibres with a greater diameter. This is generally advantageous for high density products. Such high density products are often subject to mechanical load, e.g. flat roof insulation products, which must be able to withstand the weight of a person walking on the roof. Relatively thin fibres will break more easily than thicker fibres. For example, the first rotor rotates to give an acceleration field of 25 to 40 km/s², the second rotor rotates to give an acceleration field of 125 to 175 km/s², the third rotor rotates to give an acceleration field of 150 to 200 km/s², the optional fourth rotor rotates to give an acceleration field of 225 to 300 km/s². However for some high density products it is preferred that the acceleration field is in the higher end of the ranges to give fibres with smaller diameter if there is no need for the higher mechanical stability. Such products could be e.g. pipe insulation adapted for use at high temperature.

If the resulting MMVF substrate is a medium or low density product, such as one having a density in the range 15 to 120 kg/m³, then the acceleration fields of the rotors should be at the higher end of the ranges as this will give fibres with a smaller diameter. For example, the first rotor rotates to give an acceleration field of 40 to 60 km/s², the second rotor rotates to give an acceleration field of 175 to 250 km/s², the third rotor rotates to give an acceleration field of 200 to 300 km/s², the optional fourth rotor rotates to give an acceleration field of 300 to 400 km/s².

Each rotor may have a separate driving means, or one or more rotors may use the same driving means.

Preferably the method includes providing a fiberising chamber and collector means comprising a conveyor in the base of the chamber; collecting the blown fibres as a web and carrying them away from the set of rotors.

The acceleration field, or the centripetal acceleration, of a rotor is the field G, where $G = r\Omega^2$ $$\Omega = \frac{2\pi n}{60}$$

where r is the radius of the rotor and
$\Omega$ is the angular velocity of the rotor and
n is the revolutions per minute.

We have found that it is possible to achieve useful results with an acceleration field on the first rotor that is very much greater than the force on the first rotor of conventional 3 or 4 rotor apparatus for forming MMVF and that when we do this we reduce the amount of shot that is formed in the process. This improves distribution on to the second and subsequent rotors and it reduces shot formation, and improves overall fibre formation. Some useful formation of fibres may occur on the first rotor.

In the invention, the ratio of diameters between the first rotor and the last rotor in the series is preferably from 1.1:1 to 1.5:1, often around 1.3:1. For instance the first rotor typically has a diameter of 100 to 300 mm, often around 200 to 250 mm. The final rotor may have a diameter of 130 to 350 mm, often around 250 to 300 mm. The ratio of the diameters of the first rotor to the second rotor typically is from 1.1:1 to 1.5:1 and from the second to the third rotors typically is from 1:1 to 1.3:1, preferably around 1:1. In particular, it is often preferred that the second, third and any subsequent rotors should have substantially the same diameter.

The ratio of the rotation speed (in revolutions per minute) of the final rotor in the set to the first rotor is typically in the range 1.1:1 to 1.7:1, often around 1.4:1. The speed of the first rotor generally is typically in the range 4,500 to 7000 rpm. The speed of the final rotor may be in the range 12,000 to 16,000 rpm. The ratio of the speed of each rotor to the speed of the preceding rotor in the series is generally in the range 1:1 to 1.5:1, usually 1.1:1 to 1.3:1.

The ratio of the peripheral velocity of the second rotor to the peripheral velocity of the first rotor is generally from 1.1:1 to 1.8:1, often around 1.1:1 to 1.5:1 and the ratio of the peripheral velocity of each subsequent rotor to the peripheral velocity of the preceding rotor is often 1.1:1 to 1.5:1, generally around 1.1:1 to 1.3:1.

The axis of the second rotor is preferably positioned such that a line drawn from the axis of the first rotor to the axis of the second rotor makes an angle of from 0 to 20°, preferably 5 to 10°, below the horizontal. This is particularly suitable when, as is preferred, the melt strikes the first rotor at a position that makes an angle of from 40 to 65°, preferably 45 to 60°, above that horizontal. Thus the melt travels through an angular distance generally of 45 to 80°, preferably 50 to 70°; from the point at which it strikes the first rotor to the line joining the axes of the first and second rotors.

The second, third and fourth (where present) rotors, and optionally also the first rotor, may each have an air slot associated with it wherein the internal diameter of the slot is substantially the same as the external diameter of the periphery of the rotor, so as to permit air to be blown over part at least of the periphery of those rotors as a wall jet, as described in GB 1,559,117. Preferably the slot directs the air blast parallel to the surface and the diameter of the slot is preferably the same as the diameter of the periphery of its associated rotor. However it can be a few millimeters more and/or the air stream may emerge with a slight conical angle provided that a wall jet is formed over the surface of the associated rotor. Whether or not a wall jet is occurring can easily be established by identifying the velocity profile adjacent to the surface. When a wall jet exists, the greatest velocity is close (e.g., within 10 mm) to the surface both at the rear edge of the rotor and at the front edge of the rotor.

The air that provides the wall jet may emerge from the slot solely in an axial direction or may emerge with tangential and axial velocity components. For instance the air can have a tangential velocity up to 30% or 50% or more of the peripheral velocity. It can have a tangential velocity of up to 50 m/s, preferably 80 to 100 m/s. The linear velocity is generally 100 to 300, often 100 to 200, meters per second.

The air slot can consist of inner and outer slots, wherein the inner slot provides an inner blast of air that is sufficiently close to the surface to form a wall jet and the outer slot provides an outer blast of air that merges with the inner blast so as to give a wall jet effect to the combined blasts. Generally the inner surface of the outer slot is not more than 20 or 30 mm radially from the surface of the rotor and generally it is within 10 mm. Preferably the inner and outer blasts have different angles of travel at the time of exiting from their slots. For instance the inner blast can be wholly axial and the outer slot can contain direction means to cause the outer blast to have the desired tangential component.

The direction means can be in the form of guides in the slot associated with the final rotor in the set (and often in all the slots) and are arranged to direct the air at an angle to the axial direction that varies along the length of the slot between a higher angle that is co-rotational with the rotor and a lower angle.

Thus the air stream will emerge from the slot at different angles along the length of the slot.

It is desirable that there should not be a sudden transition from the higher angle to the lower angle and so preferably there is a graduated transition. Usually most of the slot is at one angle and the remainder of the slot, usually at one end, is at the other angle, but if desired the angle may, for instance, start at the lower angle, increase to the higher angle and then reduce to the lower angle.

The slot is preferably an annular or part-annular duct that extends around the associated rotor, alternatively it can be a series of adjacent orifices.

Additional air can be provided from secondary air supplies for carrying the fibres away from the rotors.

Binder can be sprayed from sprays that are coaxial with the rotors or are arranged in the chamber around the rotors.

In order to increase plant productivity a number of fiberising apparatuses can be combined. According to the present invention the apparatus used in the method of manufacture of MMVF may be provided comprising at least two fiberising apparatuses wherein each set of rotors is identical and is as defined above.

The present invention also relates to a method of manufacture of man-made vitreous fibres (MMVF) comprising:
providing a fiberising apparatus, wherein the fiberising apparatus comprises:
a set of at least three rotors each mounted for rotation about a different substantially horizontal axis;
wherein each rotor has a driving means;
rotating the rotors;
wherein the first rotor rotates to give an acceleration field of from 25 to 60 km/s$^2$ and the second and third rotors each rotate such as to give a greater acceleration field than the first rotor,
providing a mineral melt; wherein the melt has a composition comprising the following, expressed by wt of oxides:
$SiO_2$ in an amount of from 33 to 45 wt %,
$Al_2O_3$ in an amount of from 16 to 24 wt %,
an amount of $K_2O$ and/or $Na_2O$,
an amount of $CaO$ and/or $MgO$,
wherein the ratio of the amount of $Al_2O_3$ to the amount of $SiO_2$ is in the range 0.34-0.73,
wherein the ratio of the total amount of $K_2O$ and $Na_2O$, to the total amount of $CaO$ and $MgO$, is less than 1,
pouring the melt on to the periphery of the first rotor;
wherein melt poured on to the periphery of the first rotor in the set is thrown on to the periphery of the subsequent rotors in turn and fibres are thrown off the rotors; and
collecting the fibres that are formed. The method may comprise any of the preferred features defined above.

Apparatus

The present invention also relates to an apparatus for formation of man-made vitreous fibres (MMVF) comprising a set of at least three rotors each mounted for rotation about a different substantially horizontal axis and arranged such that when the rotors are rotating melt poured on to the periphery of the first rotor in the set is thrown on to the periphery of the subsequent rotors in turn and fibres are thrown off the rotors,
characterised in that the first rotor is provided with driving means and has a size such that it can rotate to give an acceleration field of from 25 to 60 km/s$^2$ and the second and third rotors are each provided with a driving means and each have a size and can rotate such as to give an acceleration field of at least 125 km/s$^2$.

The apparatus may of course have features allowing it to operate any of the preferred aspects of the methods of the invention.

Man-Made Vitreous Fibres

The present invention relates, in one aspect, to man-made vitreous fibres (MMVF) formed from a mineral melt, wherein the MMVF have a median length of 100 to 300 μm, a median diameter of not more than 2.5 μm, and wherein the ratio of the median fibre length to median fibre diameter is 25 to 500. These fibres are novel in themselves, and can be made using the method of the first and eighth aspects of the invention. MMVF made according to the methods of the first and eighth aspects of the invention, or using the apparatus according to the second aspect of the invention, may have any of the preferred features discussed below in the context of the MMVF.

Conventional MMVF have a median diameter of 3 to 5 μm and a median length of 1800 to 3000 μm, thus the MMVF of the present invention are thinner and shorter than conventional MMVF. The ratio of the fibre length to fibre diameter for conventional MMVF is generally in the range of 600 to 800.

Without wishing to be limited by theory, it is thought that the combination of the median length of the MMVF, the median diameter of the MMVF and the ratio of the median fibre length to median diameter result in improved properties of an MMVF substrate made from the MMVF. The MMVF exhibit include a lower thermal conductivity, that is the lambda value of the resulting MMVF substrate, especially above 300° C., a higher air flow resistivity of the resulting MMVF substrate and an increased skin friendliness of both the MMVF and the resulting MMVF substrate.

The median diameter of the fibres can be obtained automatically using a scanning electron microscope (SEM) to measure the diameter of the fibres and counting the number of fibres in the sample.

The median length of the fibres can be obtained by the following method which is more precise than other measurement techniques and minimises breaking of fibres. The process can be automated without introducing errors. Approximately 2 mg of MMVF is extracted from a sample of MMVF which does not contain any binder. Typically in the binder is removed by heating the MMVF to 590° C. for at least 20 minutes. The MMVF are dispersed on to a glass platelet using an implosion initiated by vacuum. Pictures of the dispersed wool fibres are then acquired by optical microscopy in transmission mode. Prior to thresholding (see below), the image is convolved with a neighborhood Gaussian filter to reduce the background noise and to bring uniformity along the fiber intensity values.

Thresholding is then performed: high gray-scale values correspond to fibers and low gray values are associated with the background or to residual noise. Isolated clustering of pixels of less than a few pixels or with an eccentricity of less than 0.5, that is, particles with roughly a circular shape, are removed as they correspond to either noise or shots. The medial axis of the fibers is then obtained through a skeleton algorithm. At this point, fibers are represented by only one pixel in width. To measure the length of each fiber, one should be able to differentiate one fiber from another including in the case where fibers cross. A score function is thus used to evaluate the probability of two segments of fibers belonging to the same fiber. The score function uses the angle difference and the distance between two segments. The score function is also used to reconstruct fibers that have been broken down to fibre segments during the thresholding step. Once each fiber is identified, the number of pixels representing it is counted and converted to the length in micrometers as the resolution of the images is known. If a fiber is crossing the border of the image, it is discarded.

The length of individual fibres is then established by measuring these parameters in the image. The median length of fibres in the sample is then calculated. At least 200 fibres should be measured, such as 250 fibres.

Preferably the median length of the MMVF is in the range 150 to 250 μm.

Preferably the median diameter of the MMVF is in the range 1 to 2.5 μm, more preferably in the range 1.5 to 2.3 μm.

The ratio of the median fibre length to median fibre diameter is in the range 25 to 500, preferably in the range 100 to 300.

The MMVF preferably have a composition comprising the following oxides, expressed by weight of oxides:
$SiO_2$ in an amount of from 33 to 45 wt %,
$Al_2O_3$ in an amount of from 16 to 24 wt %,
an amount of $K_2O$ and/or $Na_2O$,
an amount of CaO and/or MgO,
wherein the ratio of the amount of $Al_2O_3$ to the amount of $SiO_2$ is in the range 0.34-0.73, and
wherein the ratio of the total amount of $K_2O$ and $Na_2O$ (alkali metal oxide), to the total amount of CaO and MgO (alkaline earth metal oxide), is less than 1. All the amounts of the oxides are calculated by weight.

Due to the ratio of total alkali metal oxide to total alkaline earth metal oxide, these fibres fall into the class commonly known as stone fibres.

The ratio of the amount of $Al_2O_3$ to the amount of $SiO_2$ is preferably in the range 0.34-0.73 because the viscosity of melts having this ratio is in a range found to be particularly suitable for use in the invention.

The MMVF more preferably has a composition comprising the following oxides, expressed by weight of oxides:
$SiO_2$ in an amount of from 33 to 45 wt %,
$Al_2O_3$ in an amount of from 16 to 24 wt %,
$TiO_2$ in an amount of from 0 to 3 wt %,
$Fe_2O_3$ in an amount of from 6 to 11 wt %,
CaO and MgO in a total amount of from 23 to 33 wt %, and
$K_2O$ and $Na_2O$ in a total amount of 1 to 6 wt %.

There may be other elements present in the melt which when expressed by weight of oxides preferably form less than 5 wt % of the MMVF. There may also be impurities present in the MMVF.

The MMVF preferably comprises not more than 30 wt % shot having a diameter of greater than 63 μm. The MMVF may comprise 10 to 30 wt % shot having a diameter of greater than 63 μm.

The MMVF preferably comprises not more than 3 wt % shot having a diameter of greater than 250 μm. The MMVF may comprise 1 to 3 wt % shot having a diameter of greater than 250 μm.

The shot percentages are determined by taking a sample of the MMVF and sieving the material through a first sieve having apertures of diameter 250 μm, and through a second sieve having apertures of diameter 63 μm. The material in the two sieves and the material that has passed through both sieves are weighed and the percentages calculated. Prior to the sieving process the MMVF sample is subjected to a heat treatment to burn off organic material, such as binder, oil and other additives, e.g. by heating the MMVF to 590° C. for at least 20 minutes.

It is preferable to reduce the amount of shot present in the MMVF, as the presence of shot is thought to reduce the skin-friendliness of the MMVF and have an adverse effect on the thermal properties of the resulting MMVF substrate. Further, it is more efficient for the mineral melt to be formed into MMVF, rather than the mineral melt be formed into shot.

The fibre distribution of the present invention is more uniform than conventional MMVF. Preferably the range of variation of the fibre diameter defined as the 84% quantile minus the 16% quantile is less than 3.8 μm, preferably less than 3.4 μm, most preferably less than 2.4 μm. This is demonstrated in Example 2 below.

MMVF Substrate

The present invention relates, in one aspect, to a man-made vitreous fibre substrate (MMVF substrate) formed as a bonded web comprising the MMVF as described above, or MMVF made according to the methods described above, or MMVF made using the apparatus described above, and a cured binder composition.

Conventional types of binder known for use with stone wool fibres may be used. For example, the binder may be an inorganic binder, or an organic binder. Preferably the binder is an organic binder such as phenol formaldehyde binder, urea formaldehyde binder, phenol urea formaldehyde binder or melamine formaldehyde binder. Conventionally-used phenol-formaldehyde or phenol-urea-formaldehyde (PUF) based resol binders optionally contain a sugar component. For these binders, without sugar component, reference is for example made to EP 0148050 and EP 0996653. For these binders, with sugar component, reference is made to WO 2012/076462. Another group of binders that can be used are based on alkanolamine-polycarboxylic acid anhydride reaction products. A cured thermoset binder, the non-cured binder comprising (1) a water-soluble binder component obtainable by reacting at least one alkanolamine with at least one polycarboxylic acid or anhydride and, optionally, treating the reaction product with a base; (2) a sugar component; and optionally (3) urea. For these binders, reference is for example made to WO 2012/010694 and WO 2013/014076.

Other binders include a cured thermoset binder, the non-cured binder comprising:

(a) a sugar component, and one or both of
(b) a polycarboxylic acid component, and
(c) a component selected from the group of amine compounds, ammonia, ammonium salts of a polycarboxylic acids, Examples of these binders are described in WO 2007/014236, WO 2011/138458 and WO 2009/080938. For all the binders described above, the polycarboxylic acid component, if present, is preferably selected from dicarboxylic, tricarboxylic, tetracarboxylic, pentacarboxylic, and like polycarboxylic acids, and anhydrides, salts and combinations thereof.

For all the binders described above, the alkanolamine component, if present, is preferably selected from one or more of monoethanolamine, diethanolamine, triethanolamine, diisopropanolamine, triisopropanolamine, methyldiethanolamine, ethyldiethanolamine, n-butyldiethanolamine, methyldiisopropanolamine, ethylisopropanolamine, ethyldiisolpropanolamine, 3-amino-1,2-propanediol, 2-amino-1,3-propanediol, aminoethylethanolamine, and tris-(hydroxymethyl)-aminomethane.

For all the binders described above, the sugar component, if present, is preferably selected from sucrose, reducing sugars, in particular dextrose, polycarbohydrates, and mixtures thereof, preferably dextrins and maltodextrins; more preferably glucose syrups, and more preferably glucose syrups with a Dextrose Equivalent value of DE=60-99.

The binder is cured to produce an MMVF substrate. The MMVF, now containing binder, is generally cured in a curing oven, usually by means of a hot air stream. The hot air stream may be introduced into the MMVF (now containing binder) from below, or above or from alternating directions in distinctive zones in the length direction of the curing oven. After curing, the cured binder composition binds the fibres to form a structurally coherent matrix of fibres. The product may be consolidated, for instance by compression, in known manner.

Preferably the MMVF substrate is a coherent product which has a density in the range 15 kg/m$^3$ to 250 kg/m$^3$, more preferably in the range 20 kg/m$^3$ to 180 kg/m$^3$, most preferably in the range 60 kg/m$^3$ to 150 kg/m$^3$, such as 80 kg/m$^3$ to 130 kg/m$^3$.

Preferably the MMVF substrate comprises 0.5 to 6 wt % binder, such as 1 to 5 wt % binder, preferably 2 to 4 wt % binder. This is preferred when the MMVF substrate is used as building insulation.

When the MMVF substrate is used for high temperature applications, it preferably comprises 0.5 to 2 wt % binder, more preferably 0.8 to 1.5 wt % binder.

MMVF substrates made according to the invention exhibit improved air flow resistivity. Preferably, when the density of the MMVF substrate is in the range 60 to 150 kg/m$^3$ the air flow resistivity is in the range 100 to 200 kPa*s/m$^2$, preferably in the range 120 to 180 kPa*s/m$^2$. The air flow resistivity of MMVF made according to the method of the invention, and of novel MMVF of the invention, is higher than that of conventional MMVF substrates. This is thought to be due to the fibre diameter of the MMVF of the present invention. The advantage of a higher air flow resistivity is that the acoustic and heat insulation properties are improved. This means that a higher level of insulation can be achieved with a lower amount of MMVF substrate. The air flow resistivity is measured in accordance with EN29053.

MMVF substrates according to the present invention are considered to be softer and more pleasant to touch than conventional MMVF products and are thus more skin friendly. This is thought to be due at least partly to the low fibre diameter of the MMVF and the low levels of shot present. It is a further advantage of the present invention that the MMVF substrates are easier to handle than conventional MMVF substrates.

The thermal conductivity, expressed as lambda value, of the MMVF substrates of the invention is lower than conventional products and this is demonstrated in Example 3. The lambda value of the MMVF substrates is particularly low at high temperatures, such as above 300° C., compared to conventional MMVF substrates. This means that the MMVF substrates of the present invention have particular utility in areas where it is important to have a low lambda value in environments where the temperature is above 300° C., such as for use as (a) technical insulation or (b) fire protection in an industrial or marine environment. In particular, the MMVF of the present invention may be used as a marine batt, a marine slab, a marine lamella mat, a marine wired mat, a marine pipe section or a marine firebatt.

Further, the invention relates to the use of an MMVF substrate as (a) technical insulation or (b) fire protection at a temperature of at least 300° C. Products for use above 300° C. include products for thermal insulation of technical installations, e.g. pipe sections, wired mats for pipes, boilers, vessels, tanks, chimneys, and products for fire protection, such as fire slabs, fire door inlays, insulation for ventilation ducts, etc. to inhibit the spread of fire for a specified period or e.g. to protect columns against the heat of a fire for some time to avoid collapsing of a building.

The MMVF substrate preferably has an ignition loss of up to 2 wt %, such as 0.5 to 2.0 wt %, preferably 0.8 to 1.5 wt %. MMVF substrates with this ignition loss preferably have a density in the range of 60 kg/m3 to 150 kg/m$^3$, more preferably 80 to 130 kg/m$^3$. Such MMVF substrates have particular utility in high temperature environments, such as 100 to 650° C., and as fire protection. The Ignition Loss of an MMVF substrate is a measure of the amount of organic material such as binder present in the MMVF substrate. The ignition loss of a dry sample may be measured e.g. by heating the MMVF to 590° C. for at least 20 minutes and weighing the sample before and after heating to determine the loss of material.

The invention is illustrated by reference to the accompanying drawings in which.

With reference to FIGS. 1-4 the apparatus includes a set 1 of rotors each mounted on the front face 2 of a housing 3. The set is positioned at one end of a chamber to receive melt from a melt furnace. Each rotor is mounted in conventional manner on a driven axle that allows it to be rotated at high peripheral speed. The set consists of four rotors, a first rotor 4 that rotates anti-clockwise, a second fiberising rotor 5 that rotates clockwise, a third fiberising rotor 6 that rotates anti-clockwise, and a fourth fiberising rotor 7 that rotates clockwise. The bearings and drive mechanisms are not shown. Air slots 8, 9, 10 and 11 are associated with, respectively, the rotors 4, 5, 6 and 7, each slot extending around part only of the rotor. Generally each slot extends around at least ⅓ of the periphery of its associated rotor, generally around the outer part of the set of rotors. Generally it extends around not more than ⅔ or ¾ of the periphery.

Each slot leads from an air supply chamber within the housing.

Figure 1:
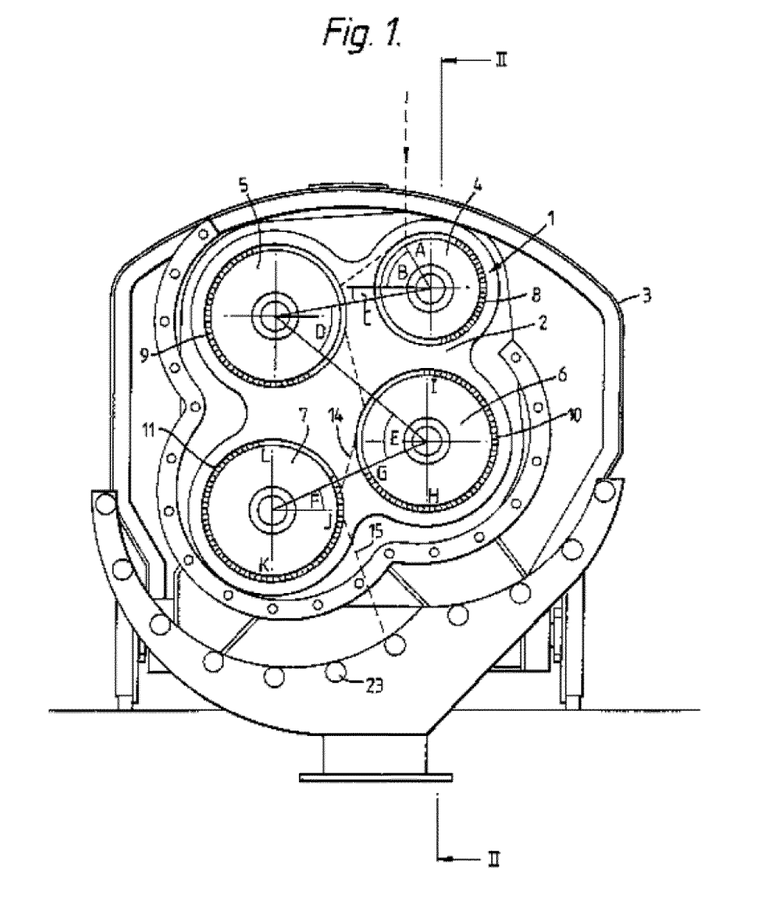
FIG. 1 is a front view of a set of rotors assembled for use in the method according to the invention.

Molten mineral melt is poured on to the rotor 4 along the path illustrated and strikes the first rotor 4 at point A that is at a position such that the angle B (i.e., the angle that A makes with the horizontal towards the second rotor) is from 40 to 65° to the horizontal, often around 45 to 60° to the horizontal. The second fiberising rotor 5 should be positioned at or only slightly below the first rotor and so the angle C typically is from 0° to 20°, often around 5 to 10°.

By this means, it is possible to ensure that melt that is thrown off the first rotor on to the second rotor impacts on the peripheral surface of the second rotor substantially at right angles (e.g., from 75 to 105° to the normal). Similarly, it is preferred that the sum of angles D, E and F should be as low as possible. F is the included angle between the horizontal and the line joining the axes of the third and fourth rotors, E is the included angle between the lines joining the axes of the third and fourth rotors and the second and third rotors, while D is the included angle between lines joining the axes of the first and second rotors with the axes of the second and third rotors. Preferably C+D+E+F is below 150° but should generally be above 120°, and most preferably it is in the range 125 to 142°, with best results being obtained at around 135 to 140°.

Some of the melt striking the first rotor 4 at A is thrown off the rotor 4 as fibres but some is thrown on to subsequent rotor 5. Some of the melt is fiberised off that rotor whilst the remainder is thrown along path 13 on to subsequent rotor 6. A significant amount of this is fiberised off rotor 6, mainly in the area where there is slot 9, but some is thrown along path 14 on to the subsequent rotor 7. A significant amount is fiberised in the general direction 15 but a large amount is also fiberised around the remainder of the rotor surface included within slot 10.

Since the slots 8, 9, 10 and 11 do not extend around the entire periphery of each rotor, the air flow in the region of paths 12, 13 and 14 can be controlled and, indeed, can be substantially zero.

In a preferred method, the first rotor 4 has a diameter of about 210 mm and rotates at about 5,000 rpm giving an acceleration field of about 29 km/s$^2$. This compares with values for conventional apparatus in accordance with GB 1,559,117 which may be, typically, around 180 mm, 3,900 rpm and 15 km/s$^2$ respectively. The second rotor (rotor 5) may have a diameter of about 280 mm and may rotate at a speed of 9,000 rpm or more, giving an acceleration field of around 125 km/s$^2$ (compared to values for a typical apparatus in GB 1,559,117 of around 230 mm, 5,500 rpm and 39 km/s$^2$ respectively).

The third rotor (6) may have the same diameter 280 mm and may rotate at 10,000 rpm to give an acceleration field of around 150 km/s$^2$, compared to typical values of 314 mm, 6,600 rpm and 75 km/s$^2$ for typical apparatus according to GB 1,559,117.

The fourth rotor (7) may again have a diameter of around 280 mm and may rotate at 12,000 rpm, giving an acceleration field of around 225 km/s$^2$ compared to values of 330 mm, 7,000 rpm and about 89 km/s$^2$ for typical apparatus according to GB 1,559,117.

The air emerging through the slots preferably has a linear velocity, in the described example, of about 100-200 m/s. This air flow may have axial and tangential components, according to the arrangement of blades 25 within the slots.

Within each slot blades 25 can be mounted at an angle, relative to the axial direction of the associated rotor, that can be predetermined at a value ranging, typically, from zero to 42°. For instance, in slot 10 the angle in the region G to H can increase from 0° at G to about 20° at H and then the angle of the blades in the region H to I can be substantially uniform at 42°. Similarly, in slot 10 the angle can increase from about zero at J up to about 20° at K and can then increase and be substantially uniform throughout the region K to L at an angle of about 42°.

In slot 8, it may be preferred to have a lesser angle, typically a uniform angle of around 15 to 30°, often around 20 or 25°.

The inner edge 24 of each slot is preferably coaxial with the associated rotor and preferably has a diameter that is substantially the same as the associated rotor.

Figure 2:
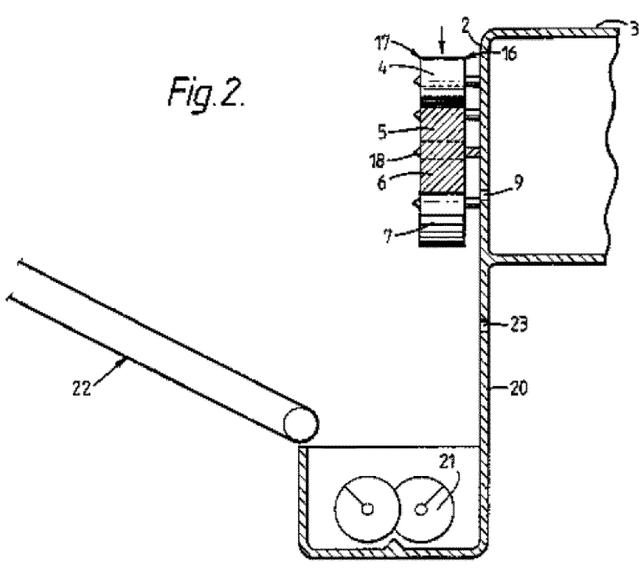
FIG. 2 is a cross-section on the line II-II through the set of rotors in FIG. 1 and through the collecting chamber in which they are positioned in use.

Binder sprays 18 can be mounted as a central nozzle on the front face of each rotor and eject binder into the fibres that are blown off the rotor. Instead of or in addition to this, separate binder sprays may be provided, for instance beneath or above the set of rotors and directed substantially axially. The fiberising chamber comprises a pit 20 having a double screw 21 that collects pearls and other fibre that drops into the pit and recycles them to the furnace. A conveyor 22 collects the fibres and carries them away from the fiberising apparatuses. Air is forced through a secondary air ring, for instance a plurality of orifices 23 arranged around the front face of the housing 2 and/or in and/or beneath the front face of the housing 2. The secondary air ring provides an air stream to promote the axial transport of the fibres away from the rotors and to control their rate of settlement and the intermixing with binder.

Figure 3:
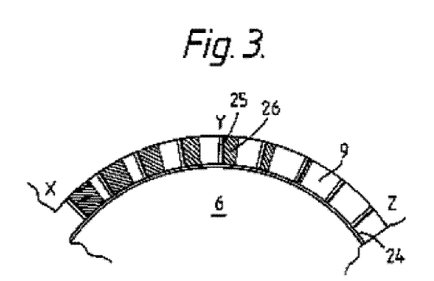
FIG. 3 is a detail of the slot around one of the rotors.

It will be seen from FIG. 3 that the inner edge 24 of the annular slot has substantially the same diameter as the outer edge of the periphery of rotor 6 and that the blades 25 are arranged substantially radially across the slot. Of course, if desired, they may be arranged at an angle. The leading edge of the blades is shown as 25, and the side face the blades is shown as 26. In FIG. 3, position X corresponds approximately to position I in FIG. 1, i.e., where the blades are arranged at about 42°, position Y corresponds to position H, i.e., where the blades are arranged at around 20°, and position G corresponds to position Z, i.e., where the blades are at 0° and thus promote truly axial flow of the air.

Although only a single air inlet 23 is illustrated in FIG. 2, preferably there can be a plurality of individually mounted air slots that are mounted beneath the rotors and that direct air in a generally forward direction. Some or all of them are pivotally mounted so that they can be relatively horizontal or relatively vertical or otherwise inclined. Also they can have blades that control the direction of air from the slot. Also, the blades can be mounted for reciprocating motion in order that they can be reciprocated during use so as to provide a pulsating air stream. Generally the slots point upwards so as to direct air upwardly and forwardly. By appropriate choice of air streams, and their movement if any, it is possible to optimise fibre collection, binder distribution, and the properties of the final product since this leads to the formation of a wall jet when the air emerges from the slot parallel to the periphery.

Although it is convenient to supply the air through true slots, a similar effect can be achieved by other means of providing a continuous curtain of air over the rotor surface, for instance a series of adjacent blast nozzles arranged around the wall rotor in the position shown in the drawings for the slots, and that will lead to the formation of a wall jet.

Figure 4:
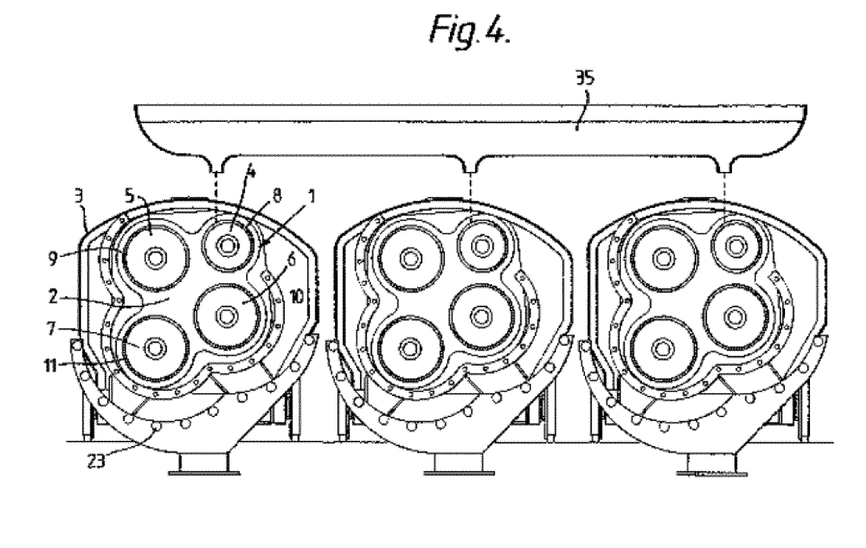
FIG. 4 is a front view of a number of fiberising means.

In FIG. 4, the reference numbers indicate the same features of the apparatus as in FIGS. 1 to 3. Separate air chambers 35 are provided for each set of rotors and lead from the melt furnace.

The invention leads to improved fiberisation of the melt, and in particular the amount of shot having size greater than 63 µm in the final MMVF is reduced in the invention compared to the amount typically present when a conventional, relatively small, first rotor is used. The amount of large shot (above 250 µm) is decreased.

The invention is now illustrated by the following non-limiting examples.

EXAMPLES

Example 1

The air flow resistivity of four MMVF substrates according to the present invention (Examples A to D) was compared to the air flow resistivity of five MMVF substrates not of the invention (Comparative Examples A to E). Each MMVF substrate contained approximately 1 wt % binder. The MMVF substrates of Examples A to D were made by the method of manufacture of the present invention and the MMVF were in accordance with the present invention. The MMVF substrates of Comparative Examples A to E were made by a different method of manufacture and the MMVF were conventional MMVF.

The MMVF of Examples A to D were made on a spinner equipped with four rotors. The first rotor had a diameter of 210 mm and was driven at approximately 5,000 rpm (acceleration field 29 km/s$^2$). The second to fourth rotor had a diameter of 280 mm and were driven at approximately 12,000 rpm (acceleration field 225 km/s$^2$).

The MMVF of Comparative Examples A to E were made on a conventional spinner equipped with four rotors. The first rotor had a diameter of 184 mm, and was driven at approximately 4,500 rpm (acceleration field 20 km/s$^2$). The second rotor had a diameter of 234 mm and was driven at approximately 7,000 rpm (acceleration field 63 km/s$^2$). The third rotor had a diameter of 314 mm and was driven at approximately 7,000 rpm (acceleration field 84 km/s$^2$). The fourth rotor had a diameter of 332 mm and was driven at approximately 7,000 rpm (acceleration field 164 km/s$^2$).

The air flow resistivity is measured in accordance with EN29053. As shown in Table 1 below, the air flow resistivity of the Examples of the present invention is considerably higher than that of the Comparative Examples, at comparable density. This demonstrates that the MMVF substrates of the present invention have improved acoustic and heat insulation properties compared to the Comparative Examples.

TABLE 1

|  | Density (kg/m$^3$) | Air Flow Resistivity (kPa*s/m$^2$) |
| --- | --- | --- |
| Example A | 107 | 170 |
| Example B | 102 | 140 |
| Example C | 98 | 160 |
| Example D | 100 | 150 |
| Comparative Example A | 111 | 55 |
| Comparative Example B | 98 | 71 |
| Comparative Example C | 102 | 48 |
| Comparative Example D | 104 | 81 |
| Comparative Example E | 104 | 68 |

Example 2

Figure 5:
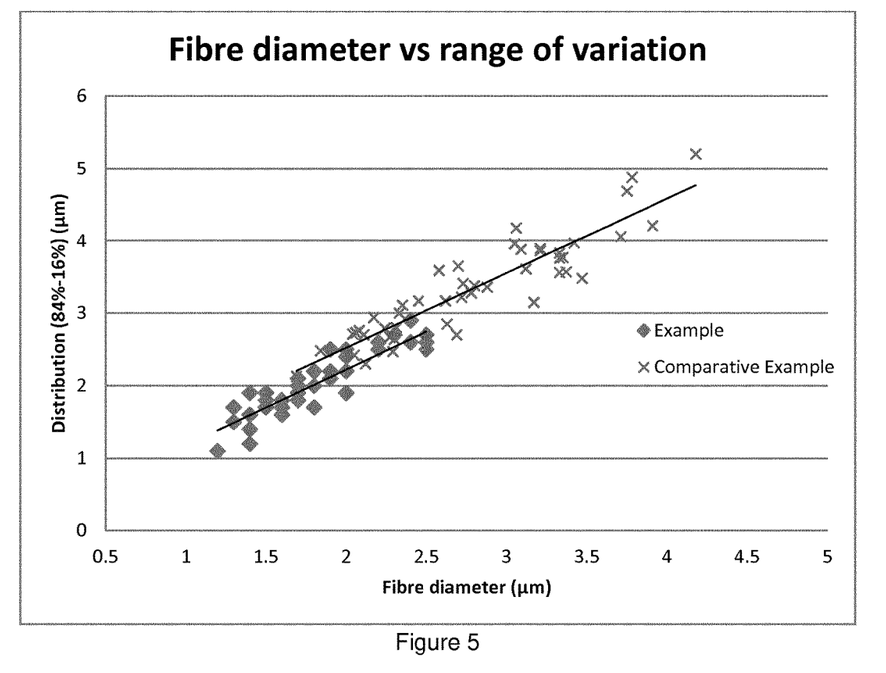
FIG. 5 shows the fibre distribution of an Example of the MMVF of the invention.

The diameter of a sample of MMVF of the present invention was compared to a sample of conventional MMVF. The MMVF of the present invention were made as described for Examples A to D. The conventional MMVF were made as described for Comparative Examples A to E. FIG. 5 shows that the spread of fibre diameters is much smaller for MMVF of the present invention than for the conventional wool. The range of variation is defined here as the 84% quantile minus the 16% quantile (+/−1× standard deviation for the fibre diameter−(logarithmic normal distribution)). This means that the probability is 68% of finding a given fibre diameter in the defined region. As shown in FIG. 5, there is far less variation in fibre diameter of MMVF of the present invention, than of conventional wool. In specific tests the range of variation for MMVF of the present invention was found to be 2.3-2.4 µm at a median fibre diameter of 1.9 µm to 2.2 µm, where the range of variation for MMVF of conventional wool was significantly higher, such as 3.7 to 5 µm at a median fibre diameter of 3.4 µm to 4.3 µm. This shows a further advantage of MMVF of the present invention as increased uniformity of fibre diameter means that MMVF substrates have greater uniformity, which has a positive influence on a number of characteristics of the MMVF, such as increased thermal performance and improved skin-friendliness.

Example 3

The lambda values of four MMVF substrates of the present invention (Examples E to H) were compared to those of four MMVF substrates not of the invention (Comparative Examples F to I). The MMVF of Examples E to H were made as described for Examples A to D. The conventional MMVF of Comparative Examples F to I were made as described for Comparative Examples A to E. Lambda was measured in accordance with EN 12667. The density was measured in accordance with EN 1602. Each MMVF substrate contained approximately 1 wt % binder. The MMVF substrates of Examples E to H were made by the method of manufacture of the present invention and the MMVF were in accordance with the present invention. The MMVF in the MMVF substrates of Comparative Examples F to I were made by a different method of manufacture and the MMVF were convention MMVF. The density of each product is shown below. The lower the lambda value, the greater the resistance of the MMVF substrate to heat. As shown in Table 2 below, MMVF substrates according to the present invention have lower lambda values across the temperature range 50 to 650° C. The advantage of using the MMVF substrate of the present invention is particularly noticeable above 200° C.

Example 5

Heat conduction tests were performed by "Forshungsinstitut für Wärmeshutz e.V. München" on the MMVF substrate according to the invention. The MMVF of Example 5 were made as described for Examples A to D. Density of the tested products was 56-59 kg/m$^3$, and the heat conduction at 10° C. found to be 0.0318 W/(m·K) according to EN 12667.

Example 6

For certain acoustic applications, the optimal flow resistivity for obtaining high sound absorption values is around 20-30 kN/m$^4$. Experimental tests found that this value was

TABLE 2

| | | Density of Example | Temperature (° C.) | | | | | | | | | | | | |
|---|---|---|---|---|---|---|---|---|---|---|---|---|---|---|---|
| | Example | kg/m$^3$ | 50 | 100 | 150 | 200 | 250 | 300 | 350 | 400 | 450 | 500 | 550 | 600 | 650 |
| Lambda HT 9 mW/mK | Example E | 85 | 37 | n/a | 48 | n/a | 62 | n/a | 77 | n/a | 100 | n/a | n/a | 133 | n/a |
| | Example F | 95 | 36 | n/a | 47 | n/a | 58 | n/a | 73 | n/a | 97 | n/a | n/a | n/a | 150 |
| | Example G | 96 | 37 | 42 | 48 | 55 | n/a | 71 | n/a | 90 | n/a | 112 | n/a | 138 | n/a |
| | Example H | 102 | 38 | 43 | 49 | 56 | n/a | 71 | n/a | 90 | n/a | 112 | n/a | 138 | n/a |
| | Comparative Example F | 92 | 38 | 44 | 52 | 61 | 72 | 84 | 98 | 114 | n/a | 151 | n/a | n/a | n/a |
| | Comparative Example G | 83 | 39 | 43 | 49 | 57 | 66 | 76 | 88 | 102 | n/a | 134 | n/a | 172 | 193 |
| | Comparative Example H | 100 | 39 | 44 | 50 | 58 | 68 | 80 | 93 | 108 | n/a | 144 | n/a | 186 | 205 |
| | Comparative Example I | 104 | 38 | 44 | 51 | 59 | n/a | 81 | n/a | 108 | n/a | 142 | n/a | 181 | n/a |

Example 4

Fire tests were performed comparing a conventional MMVF substrate with an MMVF substrate according to the invention, both at a density of 100 kg/m$^3$. The test was performed according to International Code for the Application of Fire Test Procedures (2010) Part 3. The test showed a substantial improvement of 14 minutes for the A 60 test of the MMVF substrate according to the invention (Example I) compared to the conventional MMVF substrate (Comparative Example J). The test showed an improvement for the A 30 test of 3 minutes of the MMVF substrate according to the invention (Example J) compared to the conventional MMVF substrate (Comparative Example K). The MMVF of Examples I and J were made as described for Examples A to D. The conventional MMVF of Comparative Examples J to K were made as described for Comparative Examples A to E.

| Construction | Example | result | Example | result |
|---|---|---|---|---|
| Bulkhead A 30 50 mm on level 30 mm on stiffener | Comparative Example J | Failed after 31 min At avg. temp. | Example I | Failed after 34 min At Avg temp. |
| Deck A 60 50 mm on level 30 mm on stiffener | Comparative Example K | Failed after 66 min At Max. temp. over a stiffener (TC no 6) Avg temp 134 K. | Example J | Failed after 80 min At Max. temp. over a stiffener (TC no 6) Avg temp 137 K. | obtained for an MMVF stone fibre substrate according to the invention at a density of around 40-50 kg/m$^3$. For a stone wool MMVF substrate formed by a method not according to the invention, the optimal range was found to be 50-60 kg/m$^3$. Thus the stone wool MMVF substrate made according to the invention can provide optimal acoustic properties at a lower density, and therefore using a lower amount of MMVF.

The invention claimed is:

1. A method of manufacture of man-made vitreous fibres (MMVF) comprising:
providing a fiberising apparatus, wherein the fiberising apparatus comprises:
a set of at least four rotors each mounted for rotation about a different substantially horizontal axis;
wherein each rotor has a driving means;
rotating the rotors;
wherein the first rotor rotates to give an acceleration field of from 25 to 29 km/s$^2$,
wherein the second rotor rotates to give an acceleration field of about 125 km/s$^2$,
wherein the third rotor rotates to give an acceleration field of about 150 km/s$^2$,
wherein the fourth rotor rotates to give an acceleration field of about 225 to km/s$^2$,
providing a mineral melt, wherein the melt has a composition comprising the following, expressed by weight of oxides:
SiO$_2$ in an amount of from 33 to 45 weight %,
Al$_2$O$_3$ in an amount of from 16 to 24 weight %,
an amount of K$_2$O and/or Na$_2$O,
an amount of CaO and/or MgO,
wherein the ratio of the amount of Al$_2$O$_3$ to the amount of SiO$_2$ is in the range 0.34-0.73, wherein the ratio of the total amount of $K_2O$ and $Na_2O$, to the total amount of CaO and MgO, is less than 1;

pouring the melt on to the periphery of the first rotor;

wherein melt poured on to the periphery of the first rotor in the set is thrown on to the periphery of the subsequent rotors in turn and fibres are thrown off the rotors; and collecting the fibres that are formed;

wherein the fibres that are formed have a range of variation of the fibre diameter less than 3.8 µm, defined as the 84% quantile minus the 16% quantile.

2. A method according to claim 1, wherein the melt has a composition comprising the following, expressed by weight of oxides:

$SiO_2$ in an amount of from 33 to 45 weight %,
$Al_2O_3$ in an amount of from 16 to 24 weight %,
$TiO_2$ in an amount of from 0 to 3 weight %,
$Fe_2O_3$ in an amount of from 6 to 11 weight %,
CaO and MgO in a total amount of from 23 to 33 weight %, and
$K_2O$ and $Na_2O$ in a total amount of 1 to 6 weight %.

3. A method according to claim 1, wherein the fiberising apparatus comprises four rotors.

4. A method according to claim 1, wherein the axes of the first and second rotors are arranged such that a line drawn from the axis of the first rotor to the axis of the second rotor makes an angle of from 0 to 20°, below the horizontal.

5. A method according to claim 1, wherein the ratio of the diameter of the last rotor to the diameter of the first rotor is from 1.1:1 to 1.5:1.

6. A method according to claim 1, wherein the first rotor has a diameter of 120 to 250 mm, and the final rotor has a greater diameter of 180 to 330 mm.

7. A method according to claim 1, further comprising providing a fiberising chamber and collector means comprising a conveyor in the base of the chamber; collecting the blown fibres as a web and carrying them away from the set of rotors.

8. A method according to claim 1, wherein the temperature of the surface of the periphery of the first rotor is at least 100° C. higher than the temperature of the surface of the periphery of the fourth rotor.

9. A method according to claim 1, wherein the melt is provided on to the periphery of the first rotor at a temperature of 1450 to 1575° C., preferably 1480 to 1550° C.

10. A method according to claim 1, further comprising the step of mixing the collected fibres with a binder composition and curing said binder composition, thereby forming a bonded MMVF product.

* * * * *